(12) United States Patent
Wuensche et al.

(10) Patent No.: US 10,587,020 B2
(45) Date of Patent: Mar. 10, 2020

(54) BATTERY PACK AND ENCAPSULATED INTERCONNECTION FOR A BATTERY PACK

(71) Applicant: SAMSUNG SDI CO., LTD., Yongin-si, Gyeonggi-do (KR)

(72) Inventors: Ralph Wuensche, Graz (AT); Oliver Stojanovic, Hausmannstätten (AT); Horst Krieger, Johann i. S. (AT)

(73) Assignee: Samsung SDI Co., Ltd., Yongin-si (KR)

( * ) Notice: Subject to any disclaimer, the term of this patent is extended or adjusted under 35 U.S.C. 154(b) by 260 days.

(21) Appl. No.: 15/675,577

(22) Filed: Aug. 11, 2017

(65) Prior Publication Data

US 2018/0062228 A1 Mar. 1, 2018

(30) Foreign Application Priority Data

Sep. 1, 2016 (EP) ..................... 16186797

(51) Int. Cl.
H01M 10/6557 (2014.01)
H01M 10/6556 (2014.01)
(Continued)

(52) U.S. Cl.
CPC ..... H01M 10/6557 (2015.04); H01M 2/1077 (2013.01); H01M 10/613 (2015.04);
(Continued)

(58) Field of Classification Search
None
See application file for complete search history.

(56) References Cited

U.S. PATENT DOCUMENTS

2009/0059528 A1*  3/2009  Damsohn ........... B60H 1/00278
                                                                361/701
2012/0224326 A1    9/2012  Kohlberger et al.
(Continued)

FOREIGN PATENT DOCUMENTS

DE  1 968 891 U    9/1967
EP  2 980 913 A1   2/2016
(Continued)

OTHER PUBLICATIONS

European Search Report dated Nov. 24, 2016, for corresponding European Patent Application No. 16186797.3 (9 pages).
(Continued)

Primary Examiner — Rena Dye Cronin
(74) Attorney, Agent, or Firm — Lewis Roca Rothgerber Christie LLP

(57) ABSTRACT

A battery pack includes a first battery module level and a second battery module level. The first battery module level includes: a first heat exchanger including a cooling tube that defines a cooling area; a first secondary battery cell in thermal contact with the first heat exchanger at the cooling area; a coolant distributor line outside the first heat exchanger and configured to supply coolant to the cooling tube; a coolant interconnector fluidly connecting the cooling tube or the coolant distributor line to the second battery module level; and an encapsulation element enclosing the coolant interconnector and confining a volume in which the coolant interconnector is arranged between the first battery module level and the second battery module level.

15 Claims, 7 Drawing Sheets

(51) Int. Cl.
    *H01M 10/6567*     (2014.01)
    *H01M 2/10*     (2006.01)
    *H01M 10/613*     (2014.01)
    *H01M 10/625*     (2014.01)
    *F28D 21/00*     (2006.01)

(52) U.S. Cl.
    CPC ..... *H01M 10/625* (2015.04); *H01M 10/6556* (2015.04); *H01M 10/6567* (2015.04); *F28D 2021/0043* (2013.01); *H01M 2220/20* (2013.01)

(56) References Cited

U.S. PATENT DOCUMENTS

| | | | |
|---|---|---|---|
| 2013/0207459 A1 | 8/2013 | Schröder et al. | |
| 2013/0250512 A1* | 9/2013 | Ludwig | F28F 1/00 361/689 |
| 2014/0202671 A1 | 7/2014 | Yan | |
| 2018/0048039 A1* | 2/2018 | Newman | H01M 10/6556 |

FOREIGN PATENT DOCUMENTS

| | | |
|---|---|---|
| JP | 5542209 | 5/2014 |
| KR | 10-2014-0109982 | 9/2014 |
| KR | 10-2015-0035058 | 4/2015 |
| WO | WO2013/168989 | 11/2013 |

OTHER PUBLICATIONS

EPO Office Action, dated Jun. 11, 2019, for corresponding European Patent Application No. 16 186 797.3 (5 pages).

\* cited by examiner

RELATED ART

BATTERY PACK AND ENCAPSULATED INTERCONNECTION FOR A BATTERY PACK

CROSS-REFERENCE TO RELATED APPLICATION

This application claims priority to and the benefit of European Patent Application No. 16186797.3, filed on Sep. 1, 2016 in the European Patent Office, which is incorporated herein in its entirely by reference.

BACKGROUND

1. Field

Aspects of embodiments of the present invention relate to a battery pack and an encapsulated interconnection for a battery pack.

2. Description of the Related Art

A rechargeable battery (e.g., a secondary battery) differs from a primary battery in that it is designed to be repeatedly charged and discharged, while the latter provides an irreversible conversion of chemical to electrical energy. Low-capacity rechargeable batteries are used as power supplies for, as an example, small electronic devices, such as cellular phones, notebook computers, and camcorders, while high-capacity rechargeable batteries are used as power supplies for, as an example, motors in hybrid vehicles and the like.

In general, a rechargeable battery includes an electrode assembly including a positive electrode, a negative electrode, and a separator interposed between the positive and negative electrodes, a case receiving (or accommodating) the electrode assembly, and an electrode terminal electrically connected to the electrode assembly. The case may have a cylindrical or rectangular shape depending on, for example, an intended application and use of the rechargeable battery. An electrolyte solution is injected into the case to enable charging and discharging of the rechargeable battery through an electrochemical reaction of the positive electrode, the negative electrode, and the electrolyte solution.

A battery module may be formed of a plurality of battery cells (e.g., a plurality of secondary or rechargeable battery cells) connected to each other in series. The battery module may have relatively high energy density and may be used for powering the motor of a hybrid vehicle. The battery module is formed by connecting an electrode terminal of each of a number of battery cells, the number of battery cells depending on the amount of power desired, such that a high-power rechargeable battery (e.g. a high-power rechargeable battery module) may be realized.

In order to ensure safe operation of such battery modules, heat generated by the rechargeable batteries (e.g., generated by the battery cells) should be efficiently emitted, discharged, and/or dissipated therefrom. If there is insufficient heat emission/discharge/dissipation, a temperature deviation occurs between the battery cells such that the battery module cannot generate the desired amount of power. In addition, when the internal temperature of the battery cells increases (e.g., increases due to the heat generated thereby), abnormal reactions occur in the battery cells such that charging and discharging performance of the rechargeable batteries deteriorates and the life-span of the rechargeable batteries is reduced.

Cooling devices for cooling the rechargeable battery modules by efficiently emitting/discharging/dissipating heat generated by the battery cells are generally understood. The cooling device should be in thermal contact with a surface of the battery module (e.g., in contact with a surface of the battery cells). The cooling device may be constructed as separate device and attached to the surface of the battery module or may be integrated in a housing of the battery module.

To further increase the energy density of battery systems, for example, in order to increase a driving range of electric vehicles, a plurality of battery modules may be stacked and electrically interconnected to form a battery pack. In order to ensure sufficient emission/discharge/dissipation of the heat generated by the battery modules of the battery pack, such multi-level battery packs may include a cooling device for each layer of the battery pack (e.g., for each level of battery modules in the battery pack).

The structures for distributing coolant to a plurality of battery modules are generally weak points of the battery pack in terms of mechanical stability and rigidity, both during normal use and in a crash situation. In addition, depending on the type of secondary battery included in the battery modules, for example, a lithium ion battery, and the type of used coolant, for example, water-based coolants, leaking coolant may severely damage the battery modules and even surrounding structures, for example, surrounding structures in an electric vehicle.

SUMMARY

One or more of the drawbacks of the prior art may be avoided or at least reduced or mitigated according to features and aspects of the present invention. In some embodiments, a battery pack is provided that includes a first battery module level and a second battery module level. The first battery module level includes: a first heat exchange member (e.g., a first heat exchanger) including a cooling tube defining a cooling area; a coolant distributor line outside the first heat exchange member and configured to supply coolant to the cooling tube; a first secondary battery cell in thermal contact with the first heat exchange member at the cooling area; a coolant interconnector fluidly connecting the cooling tube or the coolant distributor line of the first battery module level to the second battery module level; and an encapsulation element enclosing the coolant interconnector and confining a volume including the coolant interconnector and being between the first battery module level and the second battery module level.

In some embodiments, the battery pack includes a first battery module including the first heat exchange member as a rigid cooling plate. The first heat exchange member may be made of cast aluminum and may include cooling tubes made of, for example, a metal material (e.g., iron, aluminum, magnesium, or steel), through which the coolant flows. Cooling tubes of the first heat exchange member define the cooling area and are arranged such that a sufficient cooling effect is achieved near a surface of the first heat exchange member. The cooling area of the first heat exchange member may be an area in which a plurality of the cooling tubes or a plurality of windings of one or more cooling tubes is positioned.

The first heat exchange member may further include a coolant inlet and a coolant outlet connected to the coolant distributor lines (e.g., coolant supply and return lines). The coolant inlet and outlet are in fluid communication with the cooling tubes. The first heat exchange member may further include an area that corresponds to a connection portion of the cooling tubes between the coolant ports (e.g., the coolant inlet and outlet) and the cooling area(s). The coolant distributor lines are outside the cooling area(s) and the first heat exchange member and are configured to provide coolant to the cooling tubes via the coolant ports.

At least one first secondary battery cell is in thermal contact with the cooling area of the first heat exchange member. For example, the cooling area contacts at least one surface of the at least one first secondary battery cell. Further, the coolant distributor channels are positioned remote from the first secondary battery cells or other parts which may be electricity conductive or which may conduct electricity. In some embodiments, the cooling tubes are molded within the first heat exchange member, for example, the cooling tubes are embedded into the aluminum matrix of the rigid cooling plate to further improve separation of the coolant and the first secondary battery cells.

In some embodiments, the battery pack further includes a coolant interconnector connecting the coolant circuits of different battery module levels of the battery pack (e.g., fluidly connecting the first and second battery module levels to each other). In some embodiments, the coolant interconnector is an element of the first battery module level and provides a fluid connection to the second battery module level. However, in some other embodiments, the coolant interconnector may be considered part of the second battery module level. In some embodiments, the coolant interconnector fluidly connects a cooling tube or a coolant distributor line of the first battery module level to the second battery module level, for example, to a coolant circuit of the second battery module level.

According to embodiments of the present invention, the coolant interconnector is enclosed by an encapsulation element, and the encapsulation element (e.g., the formed enclosure) is liquid-tight (e.g., is fluidly sealed) at least with respect to the coolant used in the battery pack. The encapsulation element confines a volume including an outer surface of the coolant interconnector and is between the connected first and second battery module levels. Thus, the encapsulation element together with an outer surface of the coolant interconnector confines a volume. The volume can be defined by (e.g., solely defined by) an outer wall of the encapsulation element and, in some embodiments, partially defined by outer wall segments of connection joints, for example, connection joints between the coolant interconnector and cooling tubes or coolant distributor lines. In some other embodiments, the volume may be confined or defined by an outer wall of the encapsulation element together with a surface of the first battery module level facing the second battery module level and/or a surface of the second battery module level facing the first battery module level. The confined volume is liquid-tight at least with respect to the coolant used in the battery pack.

The encapsulation element may include an outer wall confining the volume including the outer surface of the coolant interconnector and, in some embodiments, confining surfaces of the connected battery module levels. The encapsulation element may be a monolithic component or may be constructed from multiple subcomponents. The encapsulation element may include connection joints providing a liquid-tight connection between the first and second battery module levels. The encapsulation element may further include liquid-tight connection joints between subcomponents of the battery pack.

By including the encapsulation element, the battery pack provides additional protection for the coolant interconnector. The additional protection may refer to the structure of the coolant interconnector itself and/or to the connection joints of the coolant interconnector. Thus, in the event of leakage of (e.g., of coolant leakage from) the coolant interconnector due to, for example, a structural failure of the coolant interconnector or a failure of an interconnector connection joint, leaking coolant is collected in (e.g., confined in) the volume defined by the encapsulation element. As such, a risk of contact between the coolant and the battery cells of the battery pack is further reduced. Further, the encapsulation element provides mechanical reinforcement to the coolant interconnector and, thus, may reduce a risk of structural failure.

In one embodiment, the second battery module level includes a second heat exchange member (e.g., a second heat exchanger) including a second cooling tube defining a cooling area, a second coolant distributor line outside the second heat exchange member and configured to supply coolant to the cooling tube of the second heat exchange member. The coolant interconnector fluidly connects the cooling tube or the coolant distributor line of the first battery module level to the cooling tube or the coolant distributor line of the second battery module level.

The coolant interconnector may be a monolithic component including connection joints to each of the coupled cooling tube(s) and/or the coolant distributor line(s). In other embodiments, the coolant interconnector may include a plurality of subcomponents, and each subcomponent may be monolithic with or welded/soldered to a cooling tube or coolant distributor line. In other embodiments, each subcomponent may include a connection joint for coupling to another subcomponent. In other embodiments, each subcomponent may include a first connection joint for connection to a cooling tube or a coolant distributor line and a second connection joint for connection to another subcomponent. The coolant interconnector may further include a tube that fluidly connects the connection joints of the coolant interconnector of the respective battery module levels.

In other embodiments, the battery pack may include a plurality of stacked battery module levels, and each battery module level includes a battery module including a heat exchange member including at least one cooling tube defining at least one cooling area. The battery module further includes a plurality of secondary battery cells, each of the secondary battery cells being in thermal contact with at least one of the cooling areas, a coolant distributor line outside the heat exchange member and configured to supply coolant to the cooling tubes, a coolant interconnector fluidly connecting a cooling tube or a coolant distributor line of one battery module level to a cooling tube or a coolant distributor line of another battery module level, and an encapsulation element for fluidly sealing and enclosing the coolant interconnector and confining a volume between the battery module levels and at where the coolant interconnector is connected to the battery module levels.

In some embodiments, the first battery module level and the second battery module level of the battery pack are stacked (e.g., are stacked on each other) in a stacking direction, the cooling tubes and coolant distributor lines are oriented in a direction substantially perpendicular to the stacking direction, and the coolant interconnector is oriented in a direction substantially parallel to the stacking direction.

In other embodiments, the first battery module level and/or the second battery module level, or any battery module level of the plurality of stacked battery module levels, each includes a heat exchange member defining a plurality of cooling areas corresponding to a respective plurality of secondary battery cells. Each secondary battery cell is in contact with at least one of the cooling areas of the respective heat exchange member.

In one embodiment, the encapsulation element secures the coolant interconnector against coolant leakage. These features may be achieved by adapting the material of the encapsulation element according to the type of coolant. For example, the encapsulation element may be formed of a material that is inert to the coolant (e.g., a plastic material).

In some embodiments, the encapsulation element secures the coolant interconnector against coolant leakage by, for example, mechanically reinforcing the coolant interconnector by adapting the material strength of the encapsulation element. For example, a thickness of an outer wall of the encapsulation element may be increased at potential fault regions of the coolant interconnector such as around a connection joint of the coolant interconnector. Further, the encapsulation element may include sealing gaskets (e.g., ring gaskets) fitted to connection joints of the encapsulation element. The sealing gaskets may sit tightly around connection joints of the coolant interconnector and may be formed of a rubber material.

In some embodiments, the encapsulation element secures the coolant interconnector against coolant leakage by adapting a shape of the encapsulation element. For example, the shape (e.g., a cross-sectional shape) of the encapsulation element differs from the shape of the coolant interconnector. Thus, regions for dissipating flow energy of leaked coolant are formed in the volume enclosed by the encapsulation element. In some embodiments, the encapsulation element has a cuboid shape, for example, a cuboid shape having at least one dent, depression, or deepening. The dent, depression, or deepening may be in the form of a smaller cuboid positioned in a corner of the encapsulation element and may have chamfered edges. Further, the shape of the encapsulation element may be adapted in order to form a primary mechanically connection between connected battery module levels to provide force transmission between the battery module levels and, thus, to relieve stress on the coolant interconnector.

In other embodiments of the battery pack, the encapsulation element includes an outlet configured to discharge coolant leaked from the coolant interconnector in a direction away from a secondary battery cell and/or away from the multi-level battery module. In such embodiments, the enclosure formed by the encapsulation element (e.g., the confined volume) is liquid-tight except for the outlet opening. Thus, the leaked coolant may be discharged away from any component of the battery pack carrying electricity. The leaked coolant may be discharged to the environment, for example, when water is the coolant, or may be discharged into a discharge container when environment-unfriendly coolants are used. The outlet may further include a valve.

In other embodiments of the battery pack, the encapsulation element includes a reservoir volume configured to accommodate an amount (e.g., a predetermined amount) of leaked coolant. The volume is such that, during normal use of the battery pack and with a leakage rate below a certain threshold, a sufficient amount of leaked coolant may be captured in the reservoir volume. In some embodiments, the certain amount is a significant amount of the coolant. In some embodiments, the reservoir volume prevents leakage of the coolant to the environment or to electrically charged components of the battery pack. For example, the reservoir volume may prevent leakage of the coolant for an amount of time sufficient to fix the leakage of the coolant interconnector.

In other embodiments, sensors are arranged in the outlet or in the reservoir volume and output a first output signal in response to either a certain amount of leaked coolant passing the outlet or in response to the leaked coolant in the reservoir raising to or being above a certain level. In response of the first output signal, a warning signal may be outputted to a user of the battery pack, for example, to a driver of an electrically driven vehicle that is powered by the battery pack. In some embodiments, the battery pack is automatically shut down in response to the first output signal.

The cooling tubes of the battery pack may be formed of a thermally conductive material, such as metal (e.g., copper, steel, aluminum, or magnesium). Thus, adequate heat transfer from the battery cells to the cooling tubes in the cooling areas is ensured. Further, the coolant distributor lines and/or the liquid-tight encapsulation element may be formed of a thermally insulative material, such as a plastic material (e.g., PFTE, PPE, or PP). Thus, heat transfer between the coolant and the environment outside the cooling areas is reduced.

In other embodiments of the battery pack, the first battery module level and the second battery module level are assembled within a housing. According to such embodiments, one or more heat exchange members are also assembled within the housing. For example, each of the battery module levels includes at least one heat exchange member, and thus, the housing includes multiple heat exchange members between the battery module levels to ensure thermal contact with (e.g., to ensure cooling of) each of the secondary battery cells. In some embodiments, at least one of the heat exchange members is formed as a floor (e.g., is integrated with the floor) of the battery pack housing. The coolant distributor lines may be positioned at an outer surface of the housing, and the coolant interconnector may be also provided at the outside of the housing.

In some embodiments, the cooling tubes are molded within the heat exchange member, for example, the cooling tubes are embedded in a matrix of the heat exchange member. In such embodiments, the cooling tubes are fixed to the heat exchange member without requiring any additional fixing devices for connecting the cooling tubes with the heat exchange member which simplifies the manufacturing process (e.g., by requiring less assembly effort) and significantly reduces the manufacturing costs and total weight of the battery pack. Further, the housing and the heat exchange members may be made of extruded aluminum, which has sufficient thermal conductivity and mechanical characteristics and is a relatively low-weight material.

Another embodiment of the present invention provides an encapsulated interconnection for connecting coolant circuits of a first battery module level to a second battery module level of a battery pack. The encapsulated interconnection may include a coolant interconnector including a first connection joint fluidly connected to a cooling tube or a coolant distributor line of the first battery module level, a second connection joint fluidly connected to a cooling tube or a coolant distributor line of the second battery module level, a tube fluidly connecting the first connection joint and the second connection joint to each other, and an encapsulation element configured for liquid-tightly enclosing the coolant interconnector and configured to confine a volume between the first battery module level, the second battery module level, and an outer surface of the coolant interconnector. The coolant interconnector and encapsulation element may be configured as described above with respect to the battery pack.

According to another embodiment of the present invention, a vehicle including a battery module and/or an encapsulated interconnection as described above is provided.

Further aspects and features of the present invention may be learned from the following description, the appended claims, and their equivalents.

BRIEF DESCRIPTION OF THE DRAWINGS

Aspects and features of the present invention will become apparent to those skilled in the art by describing, in detail, exemplary embodiments thereof with reference to the attached drawings, in which.

DETAILED DESCRIPTION

Figure 1:
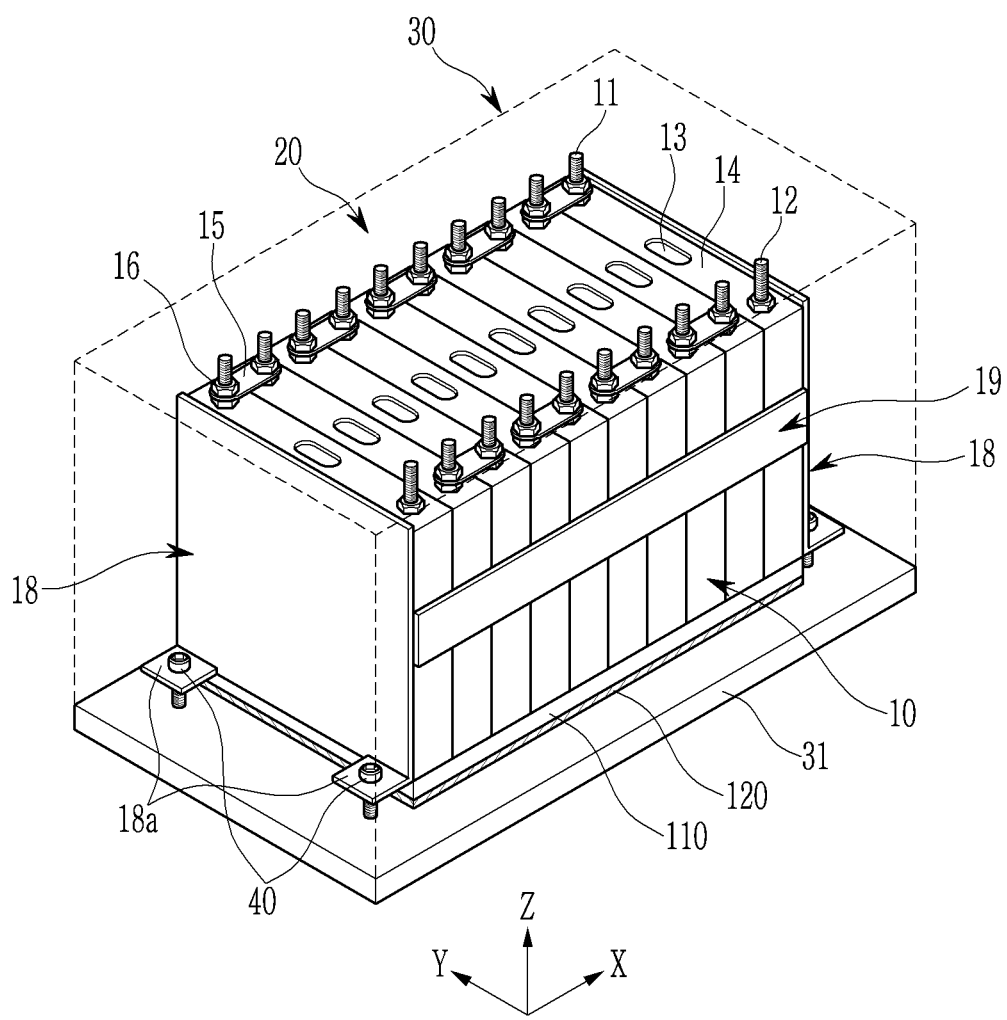
FIG. 1 is a perspective view of a conventional battery module level.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Referring to FIG. 1, a conventional battery module level 20 includes a plurality of battery cells 10 aligned along one direction and a heat exchange member 110 (e.g., a heat exchanger) adjacent to a bottom surface of the plurality of battery cells 10. A pair of end plates 18 are provided facing wide surfaces of the battery cells 10 at the outside of the battery cells 10 (e.g., the end plates 18 respectively face outermost surfaces of the outermost battery cells 10), and a connection plate 19 is provided to connect the pair of end plates 18 to each other, thereby fixing the plurality of battery cells 10 together. Fastening portions 18a of the end plates 18 on both sides of the battery module level 20 are fastened to a support plate 31 by bolts 40. The support plate 31 is part of a housing 30.

In the conventional battery module level 20, each battery cell 10 is a prismatic (e.g., rectangular) cell, and the wide, flat surfaces of the battery cells 10 are stacked together (e.g., are stacked facing each other) to form the battery module. Further, each battery cell 10 includes a battery case receiving (or accommodating) an electrode assembly and an electrolyte. The battery case is hermetically sealed by a cap assembly 14. The cap assembly 14 is provided with positive and negative electrode terminals 11 and 12 having different polarities from each other and a vent 13. The vent 13 is a safety device of the battery cell 10, and the vent 13 acts as a passage through which gas generated in the battery cell 10 is exhausted to the outside of the battery cell 10. The positive and negative electrode terminals 11 and 12 of neighboring battery cells 10 are electrically connected to each other through a bus bar 15, and the bus bar 15 may be fixed (e.g., may be fixed to the terminals 11 and 12) by a nut 16 or the like. The battery module level 20 may be used as power source by electrically connecting the plurality of battery cells 10 to each other to form one bundle.

Generally, the battery cells 10 generate a large amount of heat while being charged and/or discharged. The generated heat accumulates in the battery cells 10, thereby accelerating deterioration of the battery cells 10. Therefore, the battery module level 20 further includes the heat exchange member 110 adjacent to the bottom surface of the battery cells 10 to cool the battery cells 10. In addition, an elastic member 120 made of rubber or other elastic materials may be interposed between the support plate 31 and the heat exchange member 110.

The heat exchange member 110 may include a cooling plate having a size the same or substantially the same as the bottom surface of the plurality of battery cells 10 (e.g., the cooling plate may completely overlap or cover the bottom surfaces of all of the battery cells 10 in the battery module level 20). The cooling plate generally includes a passage through which a coolant moves. The coolant performs heat exchange with the battery cells 10 while circulating inside the heat exchange member 110, (e.g., while circulating inside the cooling plate of the heat exchange member 110).

Figure 2:
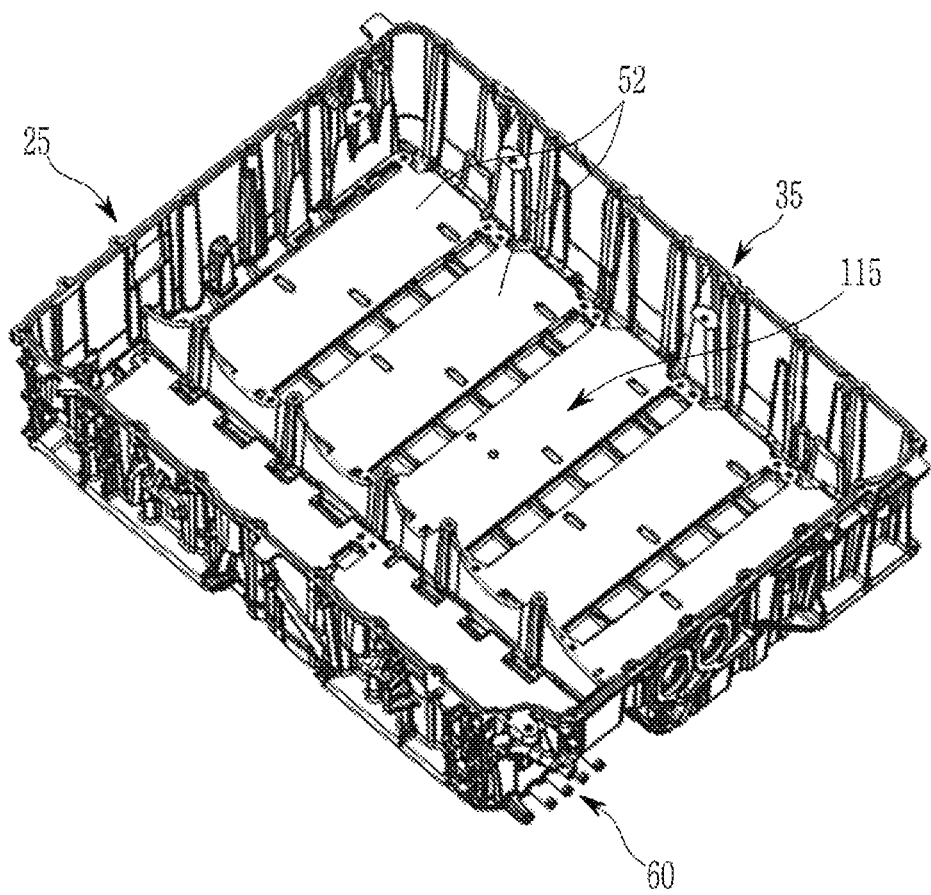
FIG. 2 is a perspective view of a battery module level according to an embodiment of the present invention.

FIG. 2 is a perspective view of a battery module level 25 (e.g., a first battery module level) according to an embodiment of the present invention. The first battery module level 25 is formed by a housing 35 including a heat exchange member 115 (e.g., a heat exchanger) on which the battery cells 10 are placed. For example, the heat exchange member 115 includes a number of cooling areas 52 onto which the battery cells 10 are placed (e.g., the heat exchange member 115 includes the cooling areas 52 at where the battery cells 10 are arranged in the battery module level 25). The heat exchange member 115 is monolithic with (e.g., is formed monolithically with) the housing 35, and coolant distributor lines 60 are placed at the outer surface of the housing 35 and the heat exchange member 115. The heat exchange member 115 is formed of cast aluminum.

Figure 3:
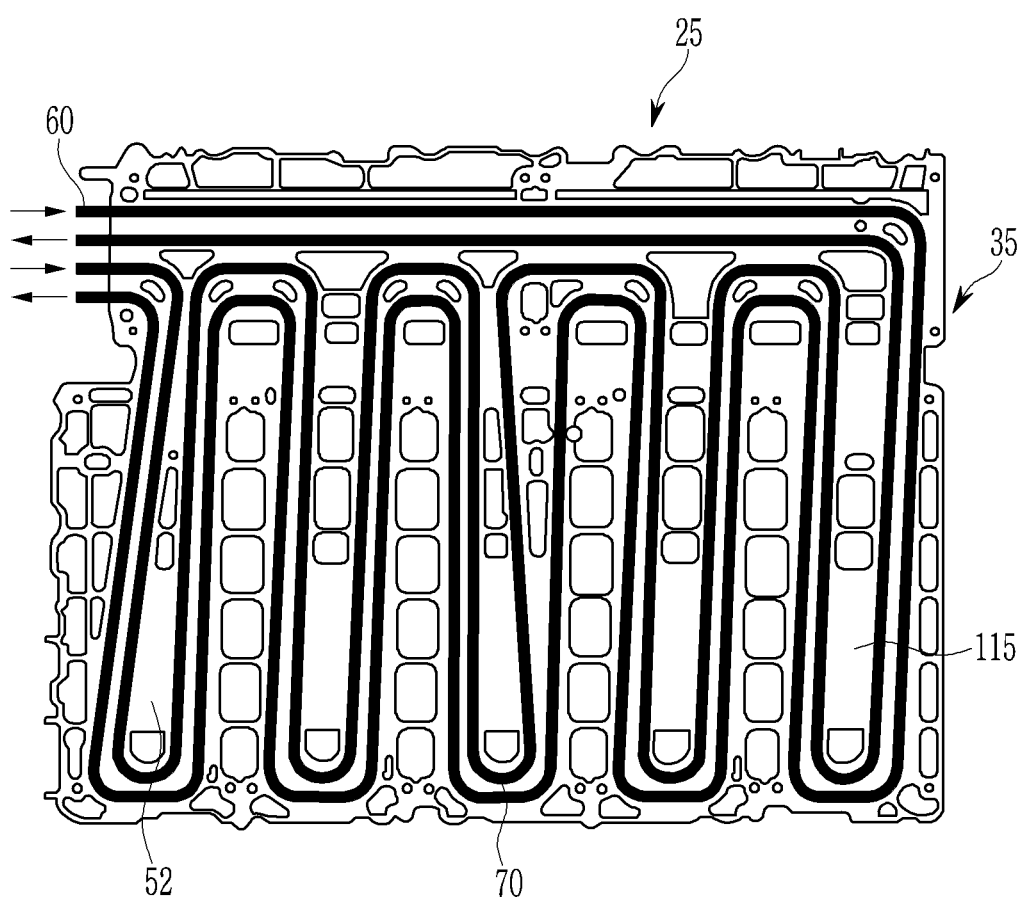
FIG. 3 is a sectional view of the battery module level shown in FIG. 2.

FIG. 3 illustrates a sectional view of the first battery module level 25 shown in FIG. 2 and shows cooling tubes 70 embedded within (or molded inside) the aluminum matrix of the heat exchange member 115. The cooling tubes 70 are formed of steel and are tightly fitted within the heat exchange member 115 such that no external fixing device is necessary (e.g., the cooling tubes 70 are firmly bonded to the heat exchange member 115). In such a configuration, thermal contact between the heat exchange member 115 and the cooling tubes 70 is improved and/or optimized.

The cooling tubes 70 are illustrated as forming (e.g., being bent to form) five loops (e.g., five parallel loops), with each loop corresponding to one of the cooling areas 52. Supply and return coolant distributor lines 60, sections of which are shown, are connected to the cooling tubes 70 such that opposed flow of the coolant occurs to ensure homogenous cooling of the battery cells 10. The heat exchange member 115 further includes an area that corresponds to a connection portion of the cooling tubes 70 between the coolant ports (e.g., coolant inlet and outlet) and the coolant distributor lines 60 and the cooling area(s) 52.

Size and geometry of the cooling areas 52 may be varied such that at least four lengths of cooling tubes 70 are located underneath a bottom surface of one of the battery cells 10 that is placed on the heat exchange member 115. Increasing a number of the cooling tubes 70 further reduces the pressure loss. For more specific or targeted cooling of the battery cells 10, certain areas of the casted heat exchange member 115 may be heightened in order to improve the thermal conductivity with the battery cells 10.

The design of the cooling tubes 70 may be modified in consideration of the manufacturing process thereof. The heat exchange member 115 may be manufactured by arranging preformed steel cooling tubes 70 in a suitable casting mold. Then, molten aluminum is casted into the mold and hardened. This method ensures that the positions of the cooling tubes 70 are maintained while the liquid aluminum is poured into the mold.

Figure 4:
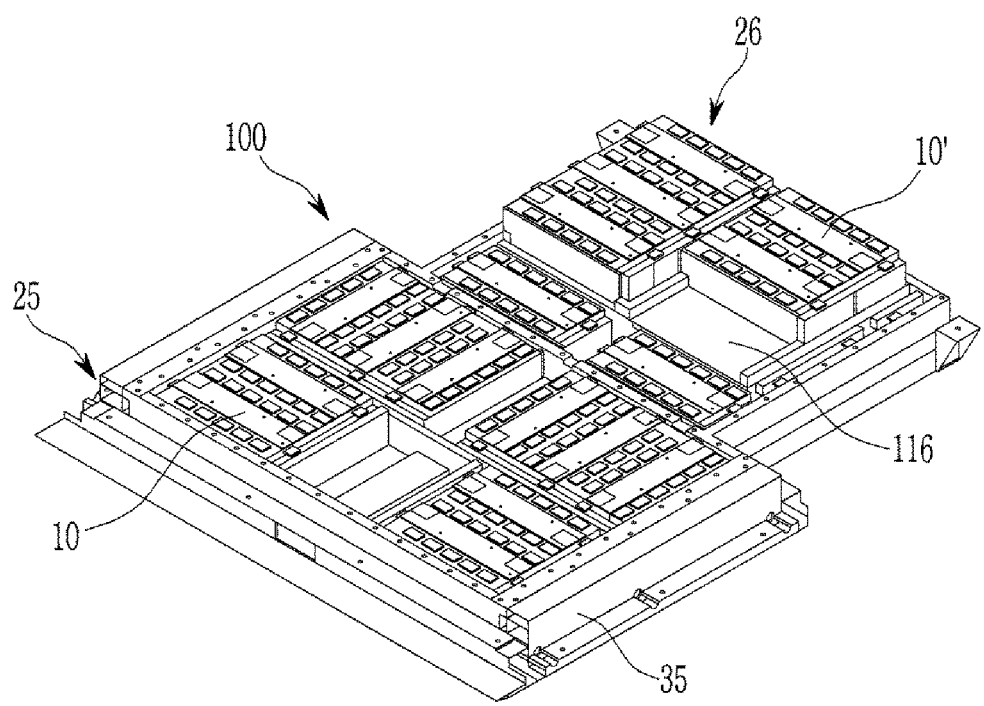
FIG. 4 is a perspective view of a battery pack according to an embodiment of the present invention.

FIG. 4 illustrates a perspective view of a battery pack 100 according to an embodiment of the present invention. The battery pack 100 includes a first battery module level 25 and a second battery module level 26 stacked above the first battery module level 25. The first battery module level 25 includes the housing 35 with the integrated heat exchange member 115 as discussed above with reference to FIGS. 2 and 3. In FIG. 4, the housing 35 is only partially shown (e.g., only a part of the housing 35 including the cooling areas 52 is shown). A first plurality of secondary battery cells 10 (e.g., a first group of secondary battery cells 10) is placed within the housing 35 and on respective cooling areas 52.

Above the first plurality of secondary battery cells 10, a second heat exchange member 116 (e.g., a second heat exchanger) is arranged. The second heat exchange member 116 is separate from the heat exchange member 115. Similar to the heat exchange member 115, the second heat exchange member 116 may be formed as a cast aluminum plate with integrated (e.g., cast in) steel cooling tubes. A second plurality of secondary battery cells 10' (e.g., a second group of secondary battery cells 10') is positioned on the second heat exchange member 116 within respective cooling areas.

Figure 5:
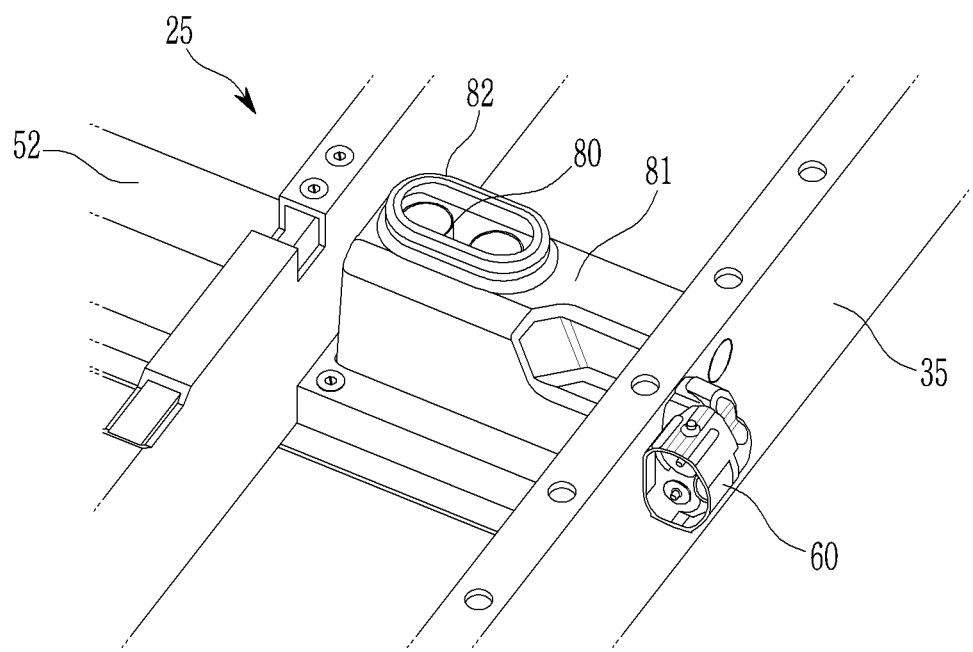
FIG. 5 is a detailed view of a battery module level including an encapsulated interconnection according to an embodiment of the present invention.

FIG. 5 is a detailed view of a battery module level including an encapsulated interconnection according to an embodiment of the present invention. FIG. 5 illustrates a portion of the housing 35 of the first battery module level 25 including an area that corresponds to a connection portion of the cooling tubes 70 between the coolant ports (e.g., the coolant inlet and outlet) of the coolant distributor lines 60 and the cooling area(s) 52 shown in FIG. 2.

Within the illustrated portion of the housing 35, a coolant interconnector 80 is positioned and is fluidly connected to the embedded cooling tubes of the housing 35 of the first battery module level 25. The coolant interconnector 80 is enclosed by an encapsulation element 81 that confines (e.g., fluidly seals) a volume (e.g., a space or area) including an outer surface of the coolant interconnector 80, the housing 35 of the first battery module level 25, and the second battery module level 26. The confined volume is liquid-tight with respect to the coolant, and the liquid-tightness of the confined volume is improved by a sealing gasket 82 positioned at a connection joint between the encapsulation element 81 and the second battery module level 26.

The coolant interconnector 80 allows vertical movement of coolant from the housing 35 of the first battery module level 25 to the heat exchange member 116 of the second battery module level 26 as shown in FIG. 4. The encapsulation element 81 provides mechanical reinforcement of the coolant interconnector 80 and is configured to prevent coolant leakage from the coolant interconnector 80. To prevent the coolant leakage, the encapsulation element 81 includes an outer wall that encloses a volume that is larger than a volume enclosed by the coolant interconnector 80 and is smaller than a volume enclosed by the housing 35 of the battery pack 100. The outer wall of the encapsulation element 81 includes a depression that forms a flow pocket for coolant if it leaks from the coolant interconnector 80.

Figure 6:
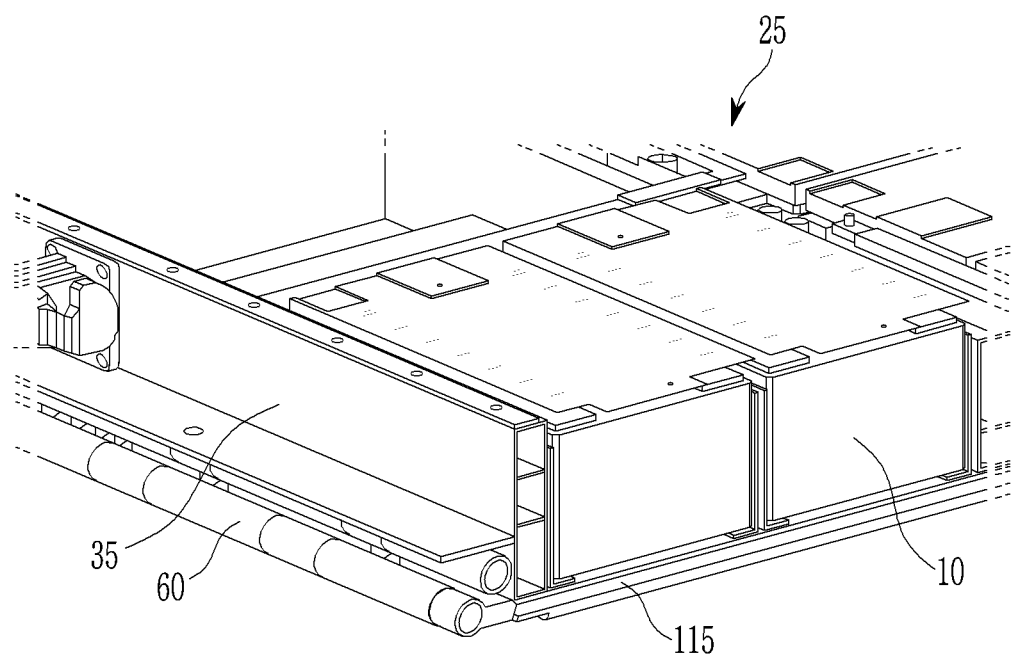
FIG. 6 is a perspective view of a battery module level according to an embodiment of the present invention.

FIG. 6 is a perspective view of a battery module level 25 according to an embodiment of the present invention showing a detailed view of an outer portion of a housing 35 of the battery module level 25 (e.g., the first battery module level 25 as shown in FIGS. 2 and 4). Within the housing 35, a first plurality of secondary battery cells 10 is placed on a bottom of the housing 35 that includes an integrated heat exchange member 115 defined by cooling tubes 70. Along an outer surface of the housing 35, the coolant distributor lines 60 for distributing coolant to the cooling tubes 70 are positioned.

Figure 7:
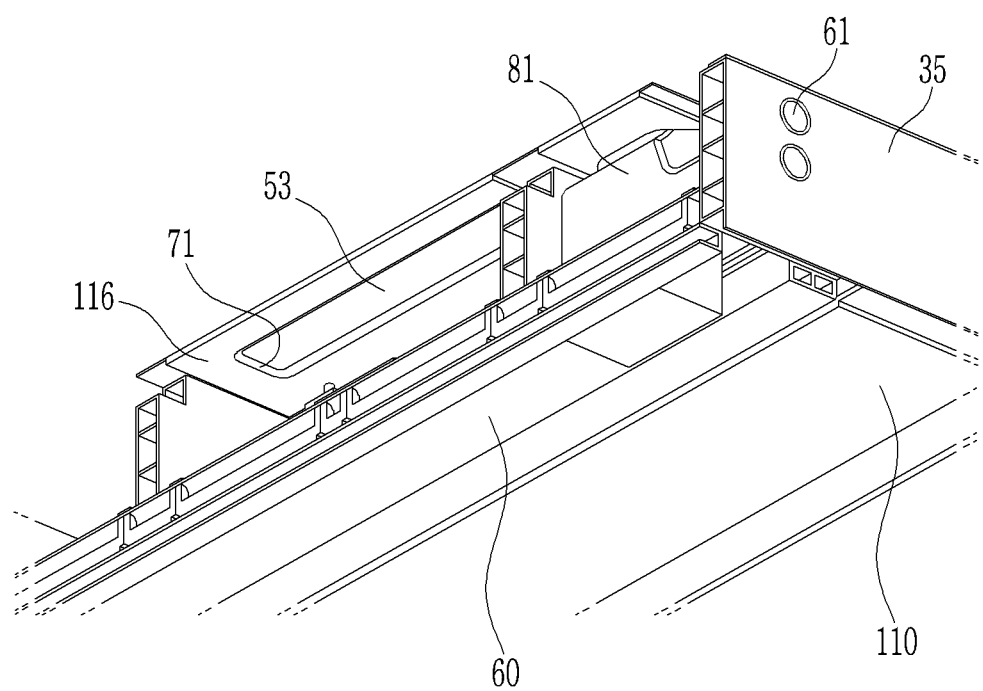
FIG. 7 is a detailed view of the battery module level including an encapsulated interconnection according to an embodiment of the present invention.

FIG. 7 is a detailed view of the battery pack 100 including an encapsulated interconnection according to an embodiment of the present invention. FIG. 7 shows a detailed view of the housing 35 of the battery pack 100 shown in FIG. 4. In FIG. 7, the second heat exchange member 116 arranged above the first plurality of secondary battery cells 10 is visible. The second heat exchange member 116 includes a cooling tube 71 that defines cooling areas 53.

The battery pack 100 further includes an encapsulation element 81 enclosing a coolant interconnector that fluidly connects the coolant distributor lines 60 of the first battery module level 25 to the cooling tube 71 of the second heat exchange member 116 of the second battery module level 26. The encapsulation element 81 (e.g., an outer wall of the encapsulation element 81) confines a volume including an outer surface of the coolant interconnector and the second heat exchange member 116 of the second battery module level 26. The encapsulation element 81 includes a closed bottom as the fluid connection between the coolant interconnector and the coolant distributor lines 60 is positioned at a side wall of the encapsulation element 81. The encapsulation element 81 confines the volume between the first battery module level 25 and the second battery module level 26.

A second coolant distributor line 61 is arranged outside the second heat exchange member 116. The second coolant distributor line 61 may extend or protrude through a side wall of the encapsulation element 81 at the second battery module level 26 and may be fluidly connected to the coolant interconnector. Thus, coolant may be redundantly provided to the second cooling tube 71 while the coolant interconnector 80 provides improved pressure compensation between the first and second heat exchange members 115 and 116.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising a first battery module level and a second battery module level, the first battery module level comprising:
 a first heat exchanger comprising a cooling tube that defines a cooling area;
 a first secondary battery cell in thermal contact with the first heat exchanger at the cooling area;
 a coolant distributor line outside the first heat exchanger and configured to supply coolant to the cooling tube;
 a coolant interconnector fluidly connecting the cooling tube or the coolant distributor line to the second battery module level; and
 an encapsulation element enclosing the coolant interconnector and confining a volume in which the coolant interconnector is arranged between the first battery module level and the second battery module level.

2. The battery pack according to claim 1, wherein the second battery module level comprises:
 a second heat exchanger comprising a cooling tube that defines a cooling area; and
 a coolant distributor line outside the second heat exchanger and configured to supply the coolant to the cooling tube of the second heat exchanger,
 wherein the coolant interconnector fluidly connects the cooling tube or the coolant distributor line of the first battery module level to the cooling tube or the coolant distributor line of the second battery module level.

3. The battery pack according to claim 2, wherein the second battery module level further comprises a plurality of secondary battery cells,
 wherein the cooling tube of the second heat exchanger further defines a plurality of the cooling areas, and
 wherein each of the secondary battery cells contacts a respective one of the cooling areas of the second heat exchanger.

4. The battery pack according to claim 1, wherein the first battery module level further comprises a plurality of secondary battery cells,
 wherein the cooling tube of the first heat exchanger further defines a plurality of the cooling areas, and
 wherein each of the secondary battery cells contacts a respective one of the cooling areas of the first heat exchanger.

5. The battery pack according to claim 1, wherein the encapsulation element is configured to secure the coolant interconnector against leakage of the coolant.

6. The battery pack according to claim 5, wherein the encapsulation element comprises an outlet configured to discharge the coolant leaked from the coolant interconnector in a direction away from a secondary battery cell and/or the battery pack.

7. The battery pack according to claim 6, wherein the encapsulation element further comprises a reservoir volume configured to accommodate the coolant leaked from the coolant interconnector.

8. The battery pack according to claim 1, wherein the cooling tube comprises a thermally conductive material.

9. The battery pack according to claim 1, wherein the encapsulation element comprises a thermally insulative material.

10. The battery pack according to claim 1, wherein the coolant distributor line comprises a thermally insulative material.

11. The battery pack according to claim 1, further comprising a housing, wherein the first battery module level is within the housing.

12. The battery pack according to claim 11, wherein the coolant distributor line and the coolant interconnector are outside of the housing.

13. The battery pack according to claim 1, wherein the encapsulation element confines an open area around an outer surface of the coolant interconnector.

14. A battery pack comprising:
 a first battery module level and a second battery module level, each of the first and second battery module levels comprising a coolant circuit comprising a cooling tube and/or a coolant distributor line; and
 an encapsulated interconnection comprising:
  a coolant interconnector comprising:
   a first connection joint fluidly connected to the cooling tube or the coolant distributor line of the first battery module level;
   a second connection joint fluidly connected to the cooling tube or the coolant distributor line of the second battery module level; and
   a tube fluidly connecting the first connection joint and the second connection joint to each other; and an encapsulation element fluidly sealing the coolant interconnector and confining a volume around the coolant interconnector between the first battery module level and the second battery module level.

15. A battery pack comprising a first battery module level and a second battery module level, the first battery module level comprising:
- a first heat exchanger comprising a cooling tube that defines a cooling area;
- a first secondary battery cell in thermal contact with the first heat exchanger at the cooling area;
- a coolant distributor line outside the first heat exchanger and configured to supply coolant to the cooling tube;
- a coolant interconnector fluidly connecting the cooling tube or the coolant distributor line to the second battery module level;
- an encapsulation element enclosing the coolant interconnector and confining a volume in which the coolant interconnector is arranged between the first battery module level and the second battery module level; and
- a housing, the first battery module level being within the housing,
- wherein the coolant distributor line and the coolant interconnector are outside of the housing.

* * * * *